(12) United States Patent
Scholz et al.

(10) Patent No.: US 8,509,828 B2
(45) Date of Patent: Aug. 13, 2013

(54) MESSAGE CENTRE CALL HANDLING (75) Inventors: Kurt Laurence Scholz, North Shore (NZ); Bryan Leslie Smith, Auckland (NZ)

(73) Assignee: Data Health Systems Limited, Auckland (NL)

( * ) Notice: Subject to any disclaimer, the term of this patent is extended or adjusted under 35 U.S.C. 154(b) by 154 days.

(21) Appl. No.: 12/933,501

(22) PCT Filed: Mar. 20, 2008

(86) PCT No.: PCT/NZ2008/000059
§ 371 (c)(1),
(2), (4) Date: Dec. 6, 2010

(87) PCT Pub. No.: WO2009/116876
PCT Pub. Date: Sep. 24, 2009

(65) Prior Publication Data
US 2011/0070868 A1 Mar. 24, 2011

(51) Int. Cl.
*H04L 12/58* (2006.01)
*H04W 4/14* (2009.01)
(52) U.S. Cl.
USPC .................. 455/466; 455/413; 455/412.1
(58) Field of Classification Search
USPC ............ 455/466, 413, 412.1; 379/45, 265.09
See application file for complete search history.

(56) References Cited

U.S. PATENT DOCUMENTS

| 7,292,689 | B2* | 11/2007 | Odinak et al. | ........... 379/265.09 |
| 2003/0054844 | A1* | 3/2003 | Anvekar et al. | ................ 455/466 |
| 2003/0177009 | A1 | 9/2003 | Odinak et al. | |
| 2004/0087301 | A1* | 5/2004 | Tobin | ............................ 455/413 |
| 2004/0152441 | A1 | 8/2004 | Wong | |
| 2005/0003837 | A1 | 1/2005 | Midkiff et al. | |
| 2005/0177368 | A1 | 8/2005 | Odinak | |
| 2007/0003024 | A1* | 1/2007 | Olivier et al. | ................... 379/45 |
| 2007/0041514 | A1 | 2/2007 | Rodkey et al. | |
| 2008/0056460 | A1 | 3/2008 | Odinak et al. | |
| 2008/0118051 | A1 | 5/2008 | Odinak | |

FOREIGN PATENT DOCUMENTS

WO  WO 2006/102030  9/2006

OTHER PUBLICATIONS

International Search Report, PCT/NZ2008/000059, Jun. 30, 2009.

* cited by examiner

*Primary Examiner* — Meless N Zewdu
*Assistant Examiner* — Jean Chang
(74) *Attorney, Agent, or Firm* — Young & Thompson (57) ABSTRACT

A text message application server capable of prioritizing incoming SMS messages and passing them to operators for a response, the operators interacting with the application server via the internet. The application server can handle multiple different called numbers, or messages with different identifying words in the message and can prioritize the messages on the basis of the message content.

12 Claims, 7 Drawing Sheets

MESSAGE CENTRE CALL HANDLING

FIELD OF THE INVENTION

The invention generally relates to call centres for handling calls generated in text, multi-media or other message formats.

More particularly the invention relates to remotely handling calls in distributed call centres for text, email, multi-media or other messages.

BACKGROUND OF THE INVENTION

It is known to provide centres for handling voice calls.

Call centres of this type may be used in various crisis management roles, for instance as help lines for various "at risk" groups. In such an environment it is important that there is continuity of contact with a caller, and that a caller who has been identified as posing a potential problem be responded to as quickly as possible.

Text messaging is a call to immediate action unlike emails which are regarded as correspondence and may require a considered response. It poses particular difficulties in a crisis management role in terms of identifying the caller and relating an urgent message to the caller's prior messages. There is a need to provide continuity of message handling in which the same person handles calls from a single caller as a chat operation, and thus since each call is likely to be handled by a different operator, the lack of continuity slows the call handling down.

For example there is a need to separate calls (particularly text messages) which are made by two or more persons sharing a single telephone, whether this is a landline telephone or a mobile telephone. Such sharing is becoming common and some method of differentiating two users, one of whom may be at risk, would be a preferred option.

It is proposed to provide a system for call handling which overcomes these shortcomings.

It will be clearly understood that, although publications may be are referred to herein, this reference does not constitute an admission that any of these documents form part of the common general knowledge in the art, in New Zealand or in any other country.

It is acknowledged that the term 'comprise' may, under varying jurisdictions, be attributed with either an exclusive or an inclusive meaning. For the purpose of this specification, and unless otherwise noted, the term 'comprise' shall have an inclusive meaning—i.e. that it will be taken to mean an inclusion of not only the listed components it directly references, but also other non-specified components or elements. This rationale will also be used when the'term 'comprised' or 'comprising' is used in relation to one or more steps in a method or process.

OBJECT OF THE INVENTION

The present invention provides a solution to this and other problems which offers advantages over the prior art or which will at least provide the public with a useful choice.

SUMMARY OF THE INVENTION

In one embodiment the invention consists in a SMS or MMS message call centre for responding to digitally recorded messages received from callers and comprising:

a message recording database recording at least the called number, the calling number, the message, and the message status, a message parser identifying the messages on the basis of at least the called number and the presence or absence of at least one known text string in the message, a message prioritiser, prioritising messages for attention by an operator on the basis of the parsed results and any previous calls from the same called number or caller, a message relayer, relaying messages to the operator for reply to the message.

Preferably a personal identifier for the caller is recorded.

Preferably the message parser identifies messages as relating to separate message queues on the basis of at least one of the called number, the personal identifier or the message content.

Preferably a queue server allocates operators to message queues.

Preferably the message parser recognises character patterns in the message for storage with the message in the message recording database.

Preferably the character pattern recognised is that of a telephone number.

Preferably the message relayer provides an alert if a reply has not issued within a set time.

Preferably messages to be sent are sent via a method chosen on a cost basis.

Preferably an automatic message may be sent to indicate when the caller is advancing in the reply queue.

Preferably an automatic call may be sent on the basis of the parsed message content.

Preferably the call centre handles and collates against a single caller messages in SMS, MMS, email and telephone formats.

In a further embodiment the invention consists in a method of grouping incoming messages to an SMS or MMS message call centre by:

grouping incoming messages from a caller to an SMS or MMS message centre by content and/or dialled number or identified caller and additionally grouping the incoming messages on the basis of the last operator responding to a message from that particular caller, making messages available to responding operators on the basis of said content and/or dialled number or identified caller, providing a return message to the caller from a responding operator.

Preferably the separated messages are weighted in dependence on the number of messages from the same caller previously responded to by a particular operator.

Preferably the weighting of each grouped message is translated into the maximum time a message awaiting a response will be queued for a particular operator.

Preferably the grouped messages are allocated to operators on the basis of perceived priority.

Preferably the text message application server is capable of prioritising incoming SMS messages and passing them to operators for a response, with the operators being able to interact with the application server via the internet or via a local area network. The application server can handle multiple different called numbers or messages with different identifying words in the message and can prioritise the messages on the basis of the message content.

Preferably the call centre also handles and collates against a single caller messages in SMS, MMS, email and telephone formats.

In another aspect the invention provides a method of grouping incoming messages to an SMS or MMS message call centre by:

grouping incoming messages from a caller to an SMS or MMS message centre by content and/or dialled number or identified caller and additionally grouping the incoming messages on the basis of the last operator responding to a message from that particular caller, making messages available to responding operators on the basis of said content and/or dialled number or identified caller, providing a return message to the caller from a responding operator.

Preferably the method allows weighting of the separated messages in dependence on the number of messages from the same caller previously responded to by a particular operator.

Preferably the method provides for translating the weighting of each grouped message into the maximum time a message awaiting a response will be queued for a particular operator.

Preferably the method provides for allocating the grouped messages to operators on the basis of perceived priority.

Preferably the method provides for operator interaction with the centre via the internet, or a local area network.

These and other features of as well as advantages which characterise the present invention will be apparent upon reading of the following detailed description and review of the associated drawings.

DETAILED DESCRIPTION OF THE INVENTION

Figure 1:
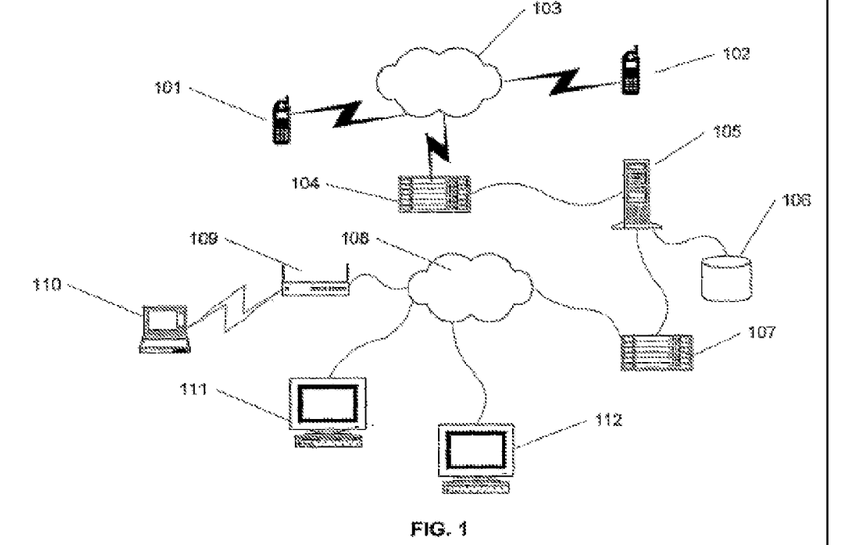
FIG. 1 is a view of the hardware elements of the invention.

Referring now to FIG. 1 a messaging system including a call centre is shown in which SMS or other messages from mobile phones such as 101, 102 are lodged through a message server 104 to an application server 105 where the messages are saved in a database 106. Typically the database stores the message, the calling number, the message status and the message timestamp, although other data relating to the message may be held. In particular data indicating the person actually lodging the call is a preferred item. Because a call may be lodged from a single phone by more than one person it may be that a single telephone number is associated with more than one person. Were the call centre to assume that these persons were the same the potential for confusion is present, and, where one of them is a person whom the call centre is treating as "at risk" there exists a potential for disaster.

Thus it is preferred that some attempt is made firstly to make an operator aware that more than one caller uses this number and thereby prompt the operators dealing with a caller to elicit a name or other identifier each time a call series is initiated.

The database may be set to issue a default reply message to a caller to indicate that the call was received and will be individually responded to as soon as possible. Such calls may be individualised by detecting the number called and any keywords in the message in known manner.

Call centre operators working variously through computer 110 with wireless router 109, and computers such as 111, 112 connected via internet 108 to web server 107 can work on and answer the messages.

Figure 2:
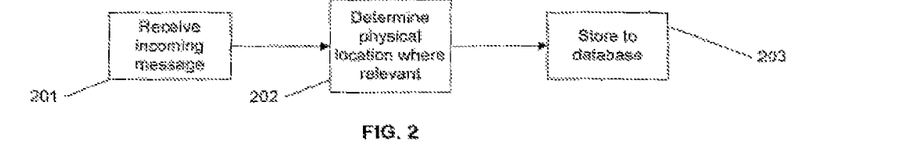
FIG. 2 is a flow diagram of the initial storage of an incoming message.

As shown in FIG. 2 the application server 105 receives an incoming SMS or similar message at 201 and via a reverse query attempts to determine the actual physical location of the message origination at 202 before storing the information at 203. The information supplied to the message server with the message is normally sufficient to identify the originating message service provider and potentially the actual message origin, though the service provider may restrict this information. This information is used in a least cost algorithm for any return messages.

Figure 3:
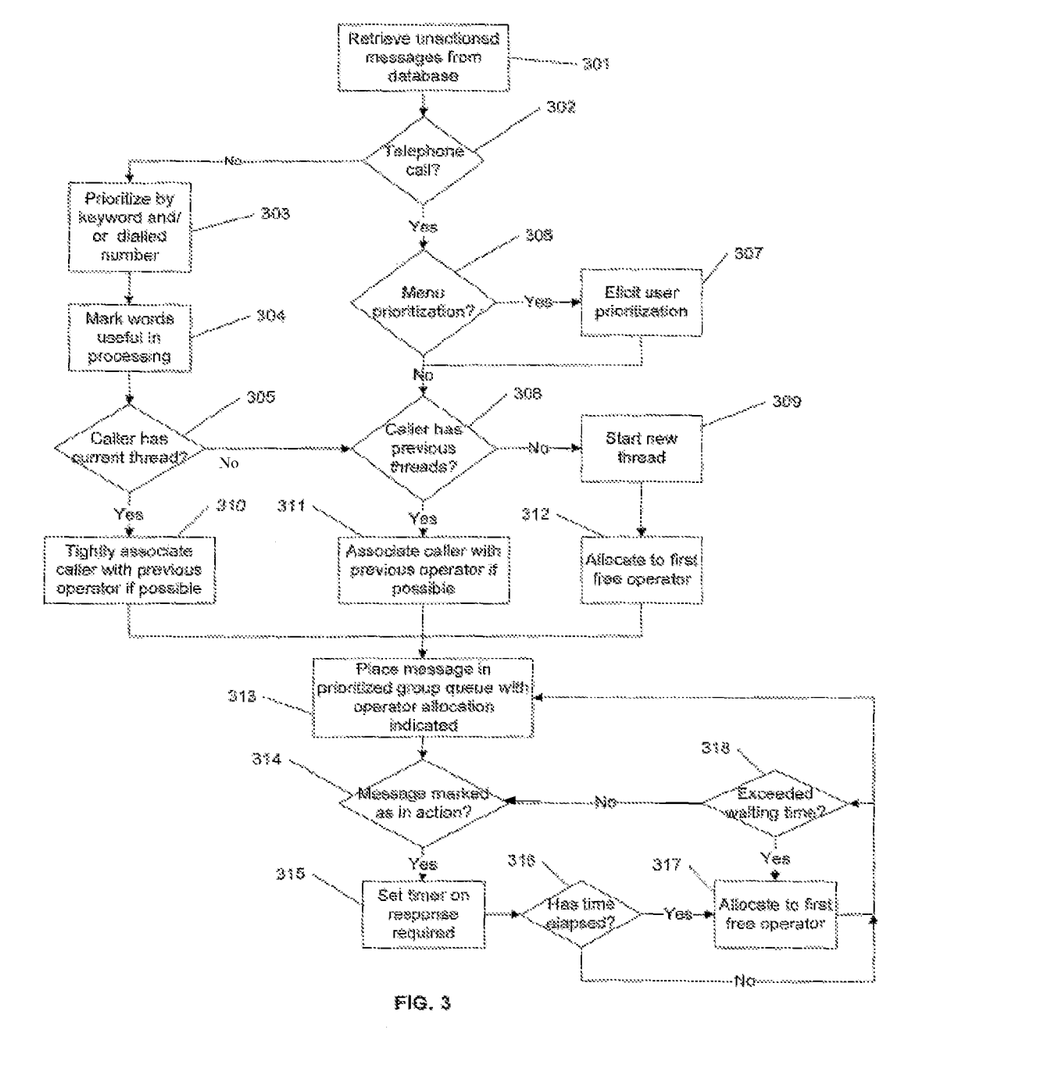
FIG. 3 is a flow diagram of the prioritisation and handling of a message.

Calls are placed for processing by an operator according to the method shown in FIG. 3 where firstly any records marked as unactioned are retrieved from the database at 301, it is determined whether the message was a result of a telephone call or not at 302, and, if not, then grouped in queues at 303 by an included keyword or by the number which was called. If the message was a result of a telephone call, then if menu prioritization of users is determined to be necessary at 306, user prioritization occurs at 307. Otherwise, the operation proceeds to step 308, discussed below.

Grouping by keyword may be carried out by parsing the message looking either for an initial keyword or "special" words, such as "HELP" or "HLP", or by checking the whole of the message for one of a number of words such as "SUICIDE" or variants.

Such grouping allows the prioritisation of messages which have special words in them, or the separation of messages on different subjects, or messages sent to ostensibly different numbers which are actually handled by one call centre. Operators may be dedicated to particular groups or may separately handle the messages from several different groups. One or more groups may be treated as a single queue so that messages are queued in a rational manner for operators. In this way the messages for a comparatively low traffic customer may be handled on a part time basis by a single operator or may be diverted to a single dedicated operator.

At 304, the message is examined for any words or character patterns which may be useful in processing the call. Thus, for instance, a web address URL, a telephone number, and an email address may all be recognized by a pattern recognition processor. Thus, for instance, any telephone number may be found by a regular expression processor using a regexp expression such as ^([\(]{1}[0-9]{3}[\)]{1}[\.|\-]{0,1}|^[0-9]{3}[\.|\-|]?)?[0-9]{3}(\.|\-|)?[0-9]{4}$. Any such patterns found are preferably stored in a database for association with the message and presented to the operator together with the message.

Once the calls are grouped and have any "special" words noted they are subjected to a prioritization step in which it is determined whether that caller is already in a "chat" session with a particular operator. At 305, it is determined if there are several recent calls and replies from one operator, here named as a "thread", and if so, the call is marked at 310 as tightly associated with that operator if that operator is still taking messages from that group, typically by allocating a low numbered association attribute and the operator's identification number. If there is no "current" thread, the history is checked at 308 to see if there are previous calls in any thread by this caller in the particular group. If so, the message is associated at 311 with the previous operator of the last call if that operator is on duty and available to the group.

If this check has no result, a comparison at 311 checks if the caller has previous threads in another group, and if the operator from that group is on duty and servicing the current group, the operator will be loosely associated at 311 with the message. Failing this, a new thread is started at 309, and the call allocated to the first free operator in the group at 312. The grouped and prioritized messages are then placed in a queue at 313 with an indication of the allocated operator.

When an operator chooses a message for action the message is marked as being under action at 314, and becomes unavailable to others, but a timer is set at 315, and should this timing process elapse with no change in the status of the message as detected at 316, the message will be reallocated to another operator at 317 and the "in action" status removed. Preferably, the screen of the initial operator will be updated to indicate this if still connected.

Similarly, if a message is in the queue and unactioned at a waiting time measured at 318, it will again be allocated to the first free operator at 317 rather than to a particular operator. The waiting time at either of these steps may be varied in dependence on whether the coupling to the operator is tight or loose and whether the priority is high or low, so that a loose coupling or a high priority is more likely to be re-allocated to another operator.

The system for prioritising the messages may additionally be sensitive to words other than designated keywords, for instance it could be set to detect the word "suicide" in the message and provide a listing which has an indication that this message has a higher priority than a normal message, similarly some keywords being used by companies which have paid a premium may have a higher priority rating than those used by others.

Figure 4:
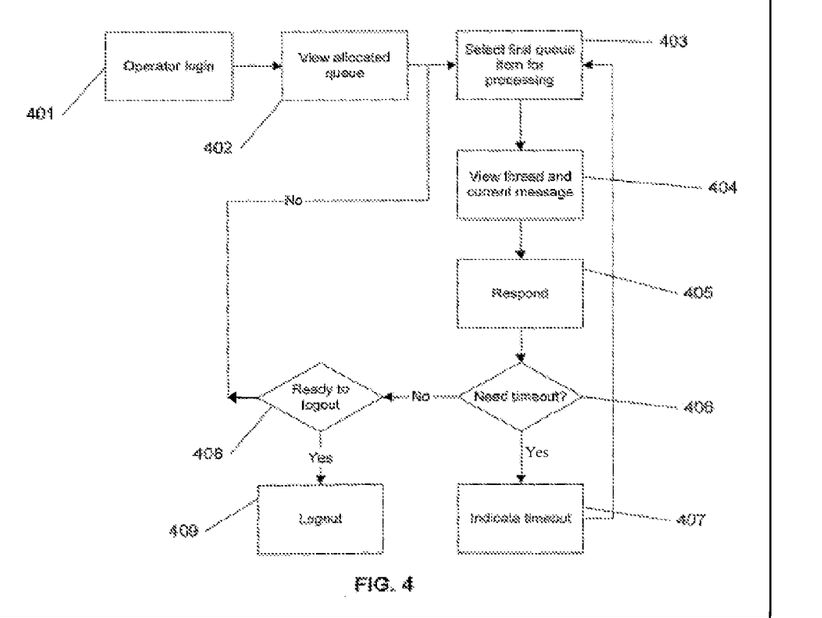
FIG. 4 is a flow diagram of an operators handling of a message.

Moving now to consider FIG. 4 in which the interaction of the operator and the message is considered, it should be remembered that the preferred method of interaction is via the internet, and that the internet is essentially stateless, that is, once information has been downloaded to a screen the screen is no longer connected to the source of that information and any interaction relies on data held within the screen and sent back with any response.

Figure 7:
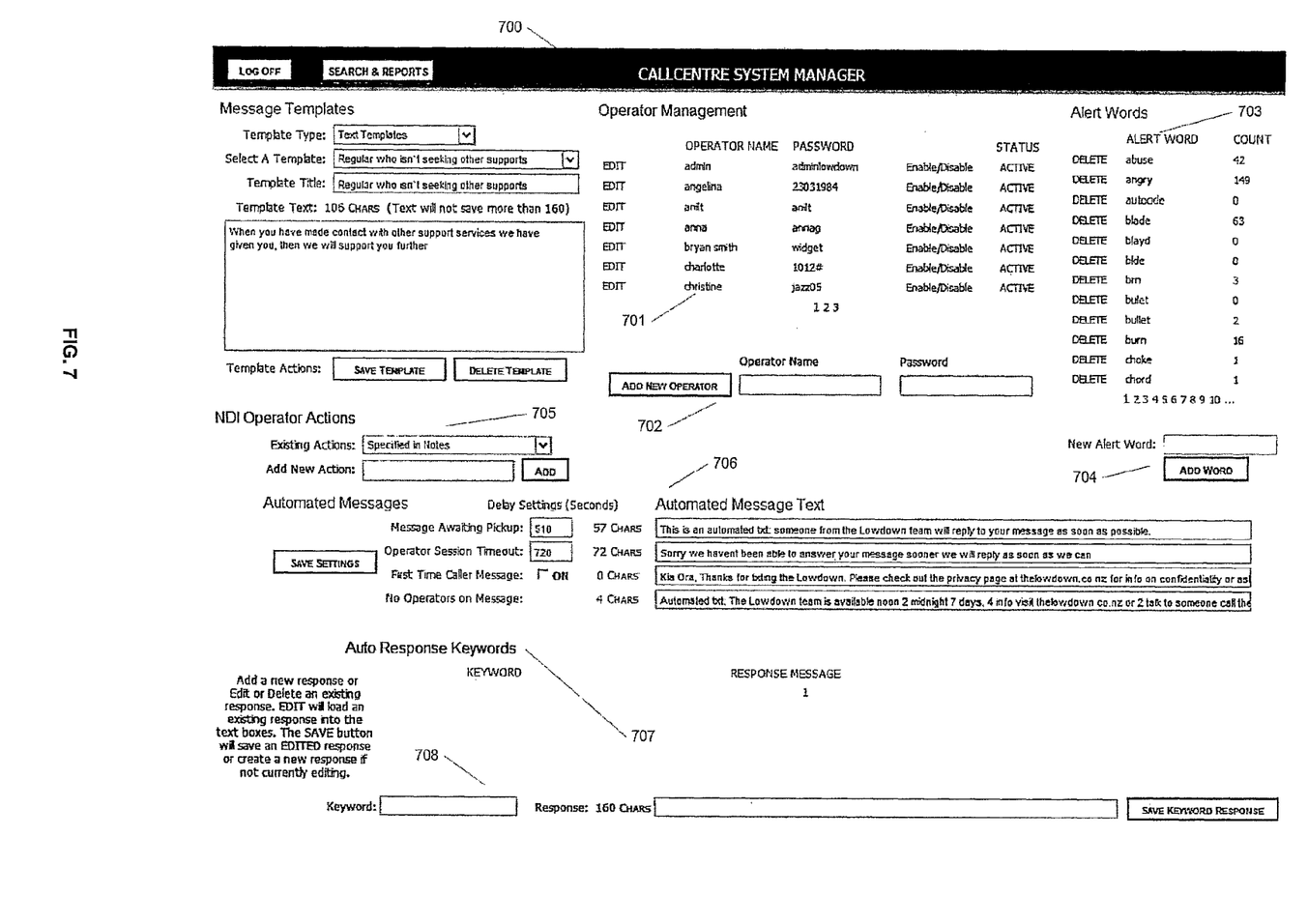
FIG. 7 shows a typical administrator screen with various setup data.

As FIG. 3 shows an operator browses to the call centre site and as indicated at 401 logs in using a user name and password. During the end of the login process a cookie verifying the user as logged in, and with a typical 10 minute life, is stored in the temporary internet cache. When the login is verified the operator is presented with a screen as shown at FIG. 7 representing the queue for that particular operator as indicated at 402. The operator selects the first message for processing at 403, typically by clicking on it as a link, and the message, plus any other previous messages and replies in the thread, is relayed via the internet and presented to the operator as at 404. Any "special" words previously detected in the message such as telephone numbers or email addresses are also presented for viewing at the same time. Also at this time the message is marked in the database as under action by that operator.

The operator can view any previous calls in, the thread and may draft a reply which is then relayed via the internet to the call centre and stored in the database prior to sending it, at which point the original message is marked as actioned. The operator can then action the next message in the queue.

Opportunity is provided at this stage for the operator to take a timeout, as at 406 where an indication 407 is returned to the call centre web server that the operator will be unavailable for some minutes. Optionally the operator may, as at 408, consider a logout and if so logs out from the site, at the same time sending an indication to the web server that the operator is no longer servicing messages.

As already indicated, if the operator does not respond to a message within a specified time of downloading the message it will be marked as reallocated at the call centre. Preferably the logged in user web browser session for this reason has a "keep alive" process, typically utilising a small piece of JavaScript code which interrogates the call centre web server every minute or less merely to indicate that the web connection is still alive, and preferably indicating which message the operator is working on. The queue may also typically refresh at this time.

Figure 5:
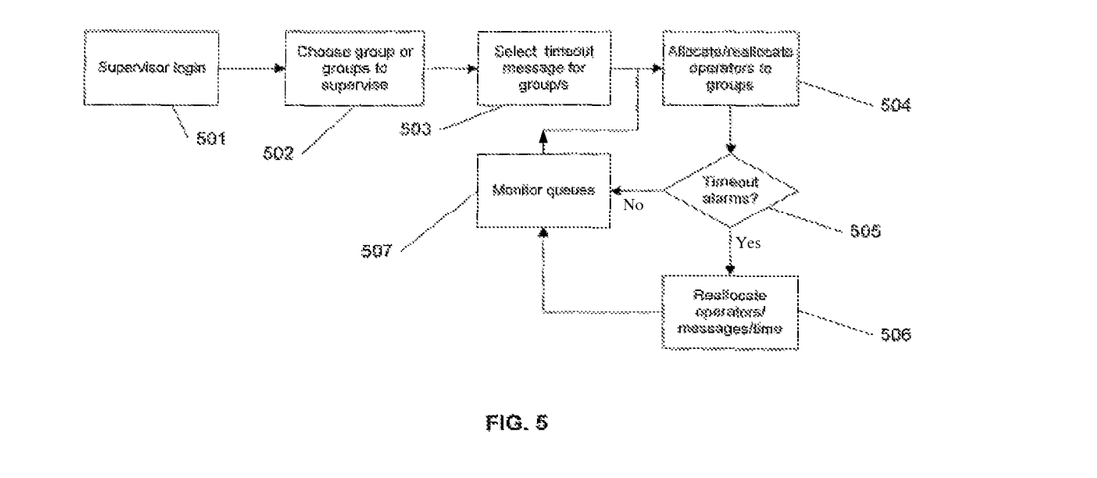
FIG. 5 is a flow diagram of a supervisor's allocation and overseeing messages.

FIG. 5 shows the process followed by a supervisor who, having logged in at 501 chooses at 502 one or more groups to supervise, and is able to, if desired, alter the timeouts for the various associated priority levels of the messages at 503. The supervisor may also allocate or reallocate operators to the groups as the operators log in or out and the length of the queued messages in each group increases or decreases. The supervisor may also monitor the timeout alarms from the process of FIG. 3 so that the responsiveness of the operators can be monitored, and on the basis of the timeouts the supervisor may choose to reallocate operator to a queue or messages to a queue as at 506. Typically the supervisor has a view of the various queue names, the number of messages in each queue, the waiting time of each queue and the number of operators currently logged in and servicing each queue.

While responding to a call an operator may take notes of any sort and embed them in a "notes" field associated with the call. These notes will be visible with the caller's messages and the when a thread is being processed.

There may additionally be provision for different operators to assume different roles with differing permissions, for instance there may be an operator role which allows the operator to initiate an SMS message, while the normal operator role only permits the operator to reply to an existing message.

Provision may also be made for different supervisor roles, with a supervisor being limited in the groups which they can view and the operators they may select to process those groups.

Figure 6:
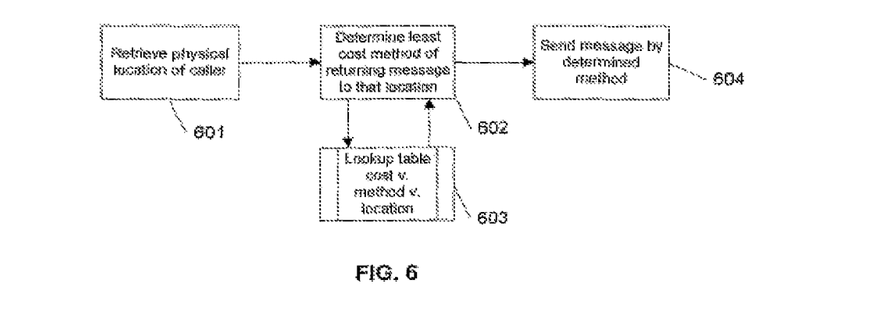
FIG. 6 is a flow diagram of a message sending method.

FIG. 6 shows the choice of location for issuing each reply message. The physical location of the caller is retrieved from the database at 601 and the type of message and the location are retrieved from lookup table in the database at 602, 603 to establish a least cost algorithm for sending the message. The message may then be sent via a remote internet SMS message disseminator, a local cell phone site, an embedded cell phone chip, or by some other means. Providing disparate ways of sending a call also allows such a call centre to continue operation even if some of the connections are not available or otherwise occupied.

Normally the message header sent with the return message to the caller is set to match the number called by the caller, so that it appears that the message is issuing from the number originally called rather than the number of a generic message centre.

Setup of operators, and other functions, may be controlled from an edit screen such as that shown at FIG. 7. A screen 700 contains a scrollable list of operators 701 which may be added to at 702, and edited, marked as ACTIVE or INACTIVE by an edit control in portion 701.

The setup may also control which words appearing in a message may raise an alert for an operator and at 703 is shown the list of such words and the facility to add more at 704. The occurrence of any of these words in the messages received may be counted and shown in conjunction with the word as illustrated. The detection of certain of these words may cause a message to be placed in a specific queue for a specific set of operators with expertise in the subject in question.

The screen shown also allows at 705 the creation of actions which can be associated with the messages. These are typically actions taken by operators and include items such as 'Discussion only", "Referred to counsellor", "Ambulance sent". These are stored in conjunction with the message and assist in providing information on the current status of an interaction with a caller. Item 706 denotes various message texts which can be sent to message senders when circumstances provide, for instance they may include a message to send to those whose message have just been received; a message for those who have been waiting for an answer for more than a specific time; a message for those who have never used the message service before; a message when no service is currently available.

Also provided may be messages to be sent in response to certain keywords as shown at 707 and added at 708. This may allow the automatic sending of a reassuring message or a request as to whether the caller will receive a telephone call from a counsellor where, for instance, the word "suicide" is found in an incoming message.

Figure 8:
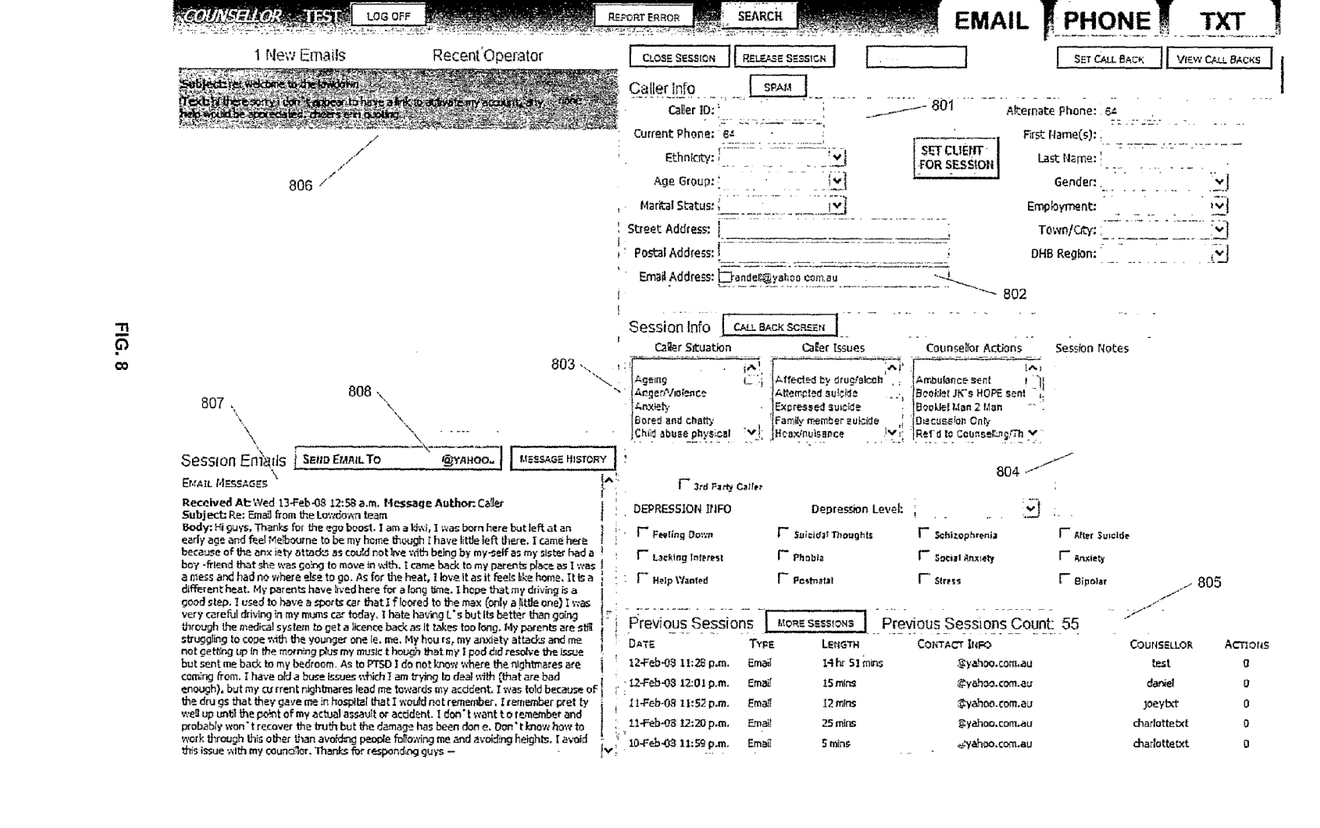
FIG. 8 shows an operator screen for responding to email messages.

FIG. 8 shows an operator screen associated with handling incoming email messages. It is assumed that the operator has opened an email from a message queue, and that the email address has been corresponded with before. At 801 is the known information on the emailer, which in this instance is the email address only. On occasion more information may be known and it may be possible to cross-correlate an email address with a phone number or even with a street or postal address. Such a cross-correlation will allow the amalgamation of the different message types from that person.

Any such cross-correlation may be carried out either manually, or by an automatic search which attempts to group like phone numbers, email addresses, street addresses or other identifiers and bring these to the attention of an operator or supervisor for resolution. The resolution may be the allocation of a common client identifier to all the occurrences found.

Additionally because it is also possible to have one or more callers originating messages from the same message source, such as a mobile phone, it is important to attempt to correlate the messages and callers regardless of the contact method or calling number or address. To achieve this there must be a realisation by the operator that the caller is not the same caller as was previously calling from the same number or address. This realisation may be assisted by detection of the language structure used in a message, for instance the use of different abbreviations in a text message from those previously appearing in earlier threads or a different sentence form factor (sentence length versus word length) in an email message. Once an operator realises that there is more than one caller with the same number or address the different callers may be asked to include a code word in their messages so that the messages can be easily differentiated. Each future call from such a number or address will first be checked for code words and failing this will be flagged to indicate the possibility that the call may be from a different person, leaving the operator to determine who is actually calling and which call session profile should be shown.

In the present case only the email address shown at 802 is known, and the list of previous sessions at 805 shows some of the available previous sessions. The screen at 807 shows the last of the previous emails in the current session with a new email at 806, sendable when link button 808 is clicked. Section 803 of the screen allows the entry of notes to the session, in particular three optional choice list boxes which may allow the quick entry of the caller situation, the caller's issues, and the counsellor or operator actions.

Figure 9:
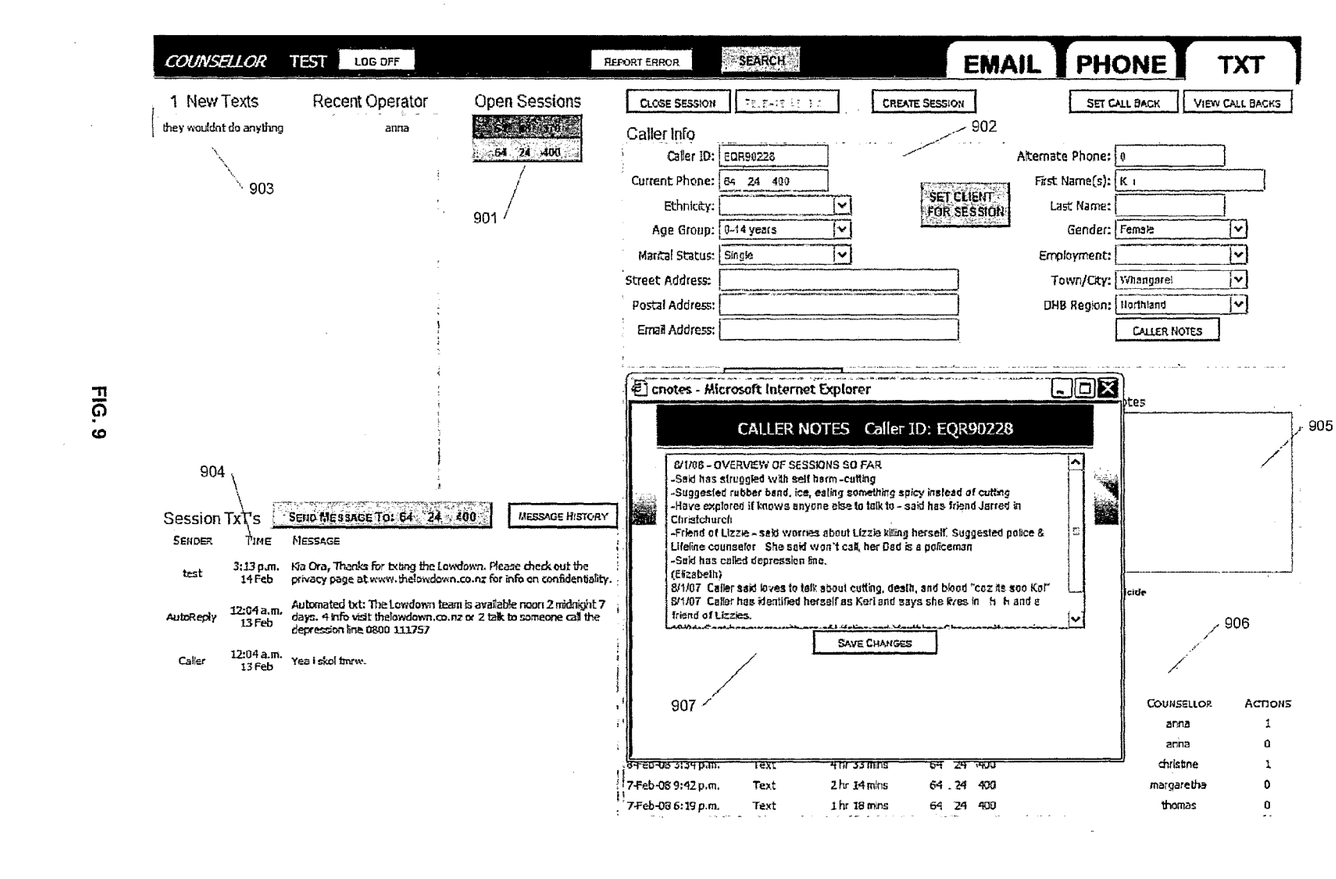
FIG. 9 shows an operator screen for responding to text messages.

FIG. 9 shows the SMS version of the same screen with an indication at 901 that there are two text sessions open, the lower being the active one, and with the client details at 902, this time indicating additional details gleaned from several sessions. Text messages from the current session appear at 904, the most recent at 903, and details of past sessions at 906. A summary of all the session notes is shown in popup 907 and may be amended if desired by the operator. An operator may have many text sessions open at any one time at 901 and preferably has some means of indicating which session is currently active and which other sessions have an incoming message waiting, and which of these messages or sessions have been nominated as priority sessions because of either the past priority of a caller or the priority allocated to an incoming message on the basis of the text of the message.

The various priorities may be indicated by the on-screen colour so that an urgent message may have a red background, a priority message a yellow background.

Figure 10:
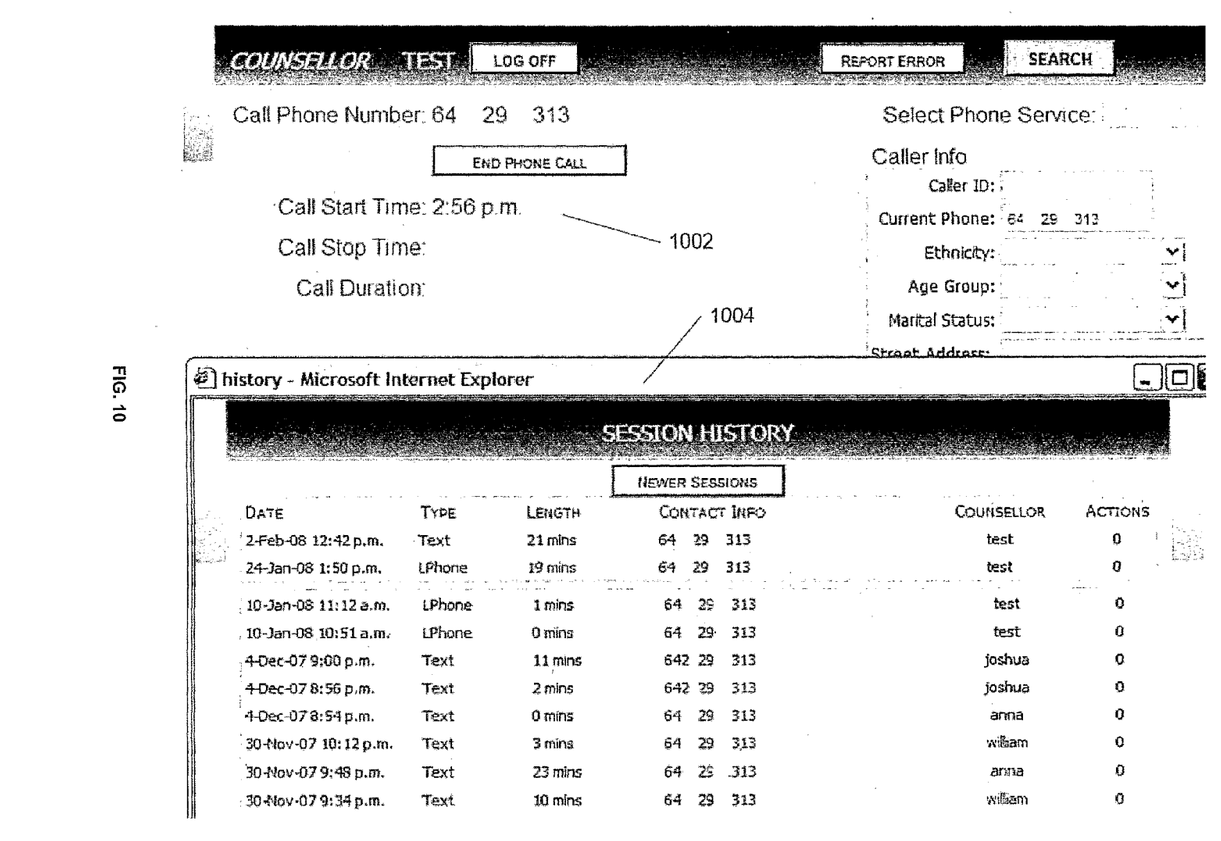
FIG. 10 shows an operator screen for responding to telephone messages.

FIG. 10 shows the same interactive screen, but this time when used for telephone calls. In this case the client details at 1001 shows only the telephone number, with the details on when this particular call started at 1002, and of previous phone sessions at 1003. Popup 1004 shows the session history of previous contacts with this client and shows that there are both telephone and text sessions in the past. If it has been established that this client had also called the call centre using an email then the client identifier of the email session could be merged with the client identifier for the text and phone sessions, thus providing a more coherent record of the interactions with the client.

It is to be understood that even though numerous characteristics and advantages of the various embodiments of the present invention have been set forth in the foregoing description, together with details of the structure and functioning of various embodiments of the invention, this disclosure is illustrative only, and changes may be made in detail so long as the functioning of the invention is not adversely affected. For example the particular elements of the call centre application may vary dependent on the particular application for which it is used without variation in the spirit and scope of the present invention.

In addition, although the preferred embodiments described herein are directed to a call centre for use in an SMS or MMS messaging system, it will be appreciated by those skilled in the art that the teachings of the present invention can be applied to other systems such as call centres for voice messages, without departing from the scope and spirit of the present invention.

The invention claimed is:

1. A short message service or multimedia message service message call center for responding to digitally recorded messages received from callers, the call center comprising:

a message recording database recording at least a called number, a calling number, a text message, and a message status;

a message parser identifying the text message on the basis of at least the called number and a presence or absence of at least one known text string in the text message;

a message prioritizer prioritizing messages for attention by an operator on the basis of the parsed results and any previous calls from the same called number or calling person; and a message relayer relaying messages to the operator for reply to the text message.

2. The message call center as claimed in claim 1, wherein a client identifier for the calling person is recorded.

3. The message call center as claimed in claim 2, wherein the message parser identifies messages as relating to separate message queues on the basis of at least one of the called number, the client identifier or the message content.

4. The message call center as claimed in claim 3, wherein a queue server allocates operators to message queues.

5. The message call center as claimed in claim 1, wherein the message parser recognizes character patterns in the text message for storage with the text message in the message recording database.

6. The message call center as claimed in claim 5, wherein the character pattern recognized is that of a telephone number.

7. The message call center as claimed in claim 1, wherein the message relayer provides an alert if a reply has not issued within a set time.

8. The message call center as claimed in claim 1, wherein an automatic message is sent to indicate when the calling person is advancing in a reply queue.

9. The message call center as claimed in claim 1, wherein an automatic call is sent on the basis of the parsed text message content.

10. The message call center as claimed in claim 1, wherein the call center handles and collates, against a single caller, messages in short message service, multimedia message service, email and telephone formats.

11. The message call center as claimed in claim 1, wherein the message status indicates whether or not the text message is under action by an operator, and the message prioritizer prioritizes unactioned messages.

12. The message call center as claimed in claim 1, wherein a client identifier for the calling person is recorded, and the message parser identifies messages as relating to separate message queues on the basis of at least the client identifier.

* * * * *

UNITED STATES PATENT AND TRADEMARK OFFICE
CERTIFICATE OF CORRECTION

PATENT NO. : 8,509,828 B2  Page 1 of 1
APPLICATION NO. : 12/933501
DATED : August 13, 2013
INVENTOR(S) : Scholz et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 232 days.

Signed and Sealed this
Fifteenth Day of September, 2015

Michelle K. Lee
*Director of the United States Patent and Trademark Office*